United States Patent [19]

de la Haye

[11] Patent Number: 4,930,717

[45] Date of Patent: Jun. 5, 1990

[54] HOSE STORING APPARATUS

[75] Inventor: Cornelis F. de la Haye, Den Haag, Netherlands

[73] Assignee: Koppens Automatic Fabrieken B.V., Netherlands

[21] Appl. No.: 319,245

[22] Filed: Mar. 6, 1989

[30] Foreign Application Priority Data

Jan. 25, 1989 [EP] European Pat. Off. ........ 89200151.2

[51] Int. Cl.[5] ...................... B67D 5/365; B65H 75/36; B60S 5/02

[52] U.S. Cl. .................................... 242/86; 242/100.2

[58] Field of Search ...................... 242/96, 100, 100.1, 242/100.2, 86, 86.1, 86.2, 86.3

[56] References Cited

U.S. PATENT DOCUMENTS

| | | | |
|---|---|---|---|
| 2,577,859 | 12/1951 | Schirmer | 242/86 |
| 2,660,337 | 11/1953 | Harks | 242/86 |
| 2,896,659 | 7/1959 | Erickson | 242/86 |

FOREIGN PATENT DOCUMENTS

| | | | |
|---|---|---|---|
| 249376 | 9/1987 | German Democratic Rep. | 242/86 |
| 8403718 | 1/1986 | Netherlands . | |

*Primary Examiner*—John Petrakes
*Attorney, Agent, or Firm*—Griffin, Branigan & Butler

[57] ABSTRACT

A hose storing apparatus comprising a casing housing, a fuel supply connection, a flexible hose connected to the fuel supply connection at one end and the other end is provided with a nozzle storable in the casing. The casing is divided at least partly into two compartments, each containing at least one loop of the hose. The loop of the hose in the first compartment accommodates a counter weight in the form of a freely movable disc. At the top of the casin, there are further provided a plurality of relatively small rollers in arcuate formation so that in their totality the formed arc crosses above the two compartments.

8 Claims, 1 Drawing Sheet

HOSE STORING APPARATUS

FIELD OF INVENTION

This invention relates to a hose storing apparatus comprising a casing housing a fuel supply connection which is connected to a flexible hose whose other end is provided with a nozzle storable in the casing by means of a support fitted therein, means being provided for storing the hose in the casing in looped form, said casing being divided at least partly into two compartments each containing at least one loop, there being further arranged at least one roller extending into the two compartments, while moreover the loop of the hose in the first compartment accomodates a counter weight in the form of a freely movable disc.

DESCRIPTION OF RELATED ART

In a similar hose storing apparatus known from Dutch patent application 84.03718, a roller extending into the two compartments is arranged fixedly near the top and the loop of the hose in the first compartment contains a counter weight in the form of a freely movable disc. This arrangement implies that a quantity of hose equal to at least the sum of the diameters of the said roller and the freely movable disc necessarily always remains in the casing and is not available for the subsequent "pulling out" of the hose. This "idle" hose section is at least 60 cm long.

Another drawback of the known apparatus is that when it is not moved outwards in a straight line, i.e. in the plane normal to the connecting line between the two axes of unwinding rollers arranged on either side of the hose passage, the hose can be pulled laterally only with great difficulty.

SUMMARY OF INVENTION

It is an object of the present invention to remove these drawbacks.

To that effect, a hose storing apparatus of the above described type is characterized in that near the top there are arranged a plurality of smaller rollers extending in arcuate formation and in their totality in both compartments. As a result, the freely movable disc can be moved substantially further upwards. A further advantage of this construction is that due to the use of and the distribution of the load over a greater number of smaller rollers, their bearings can be made substantially lighter, and at lower cost, than when use is made of a single large roller. Preferably, said smaller rollers are arranged in an arc corresponding to the natural bight of the freely depending hose.

In a further elaboration of the present invention, in which guide rollers with substantially vertical axes are provided in the casing on either side of the hose passage, there is arranged a second set of rollers upstream of, and parallel to, the first mentioned guide rollers.

The front and the rear rollers can be so arranged relatively to each other as to permit the hose to be moved sideways through them according to its natural bight or natural bending radius.

BRIEF DESCRIPTION OF THE DRAWINGS

One embodiment of the hose storing apparatus according to the invention will now be described, by way of example, with reference to the accompanying drawings, in which.

DESCRIPTION OF PREFERRED EMBODIMENTS

Figures 1, 2, 3, 4, 5:
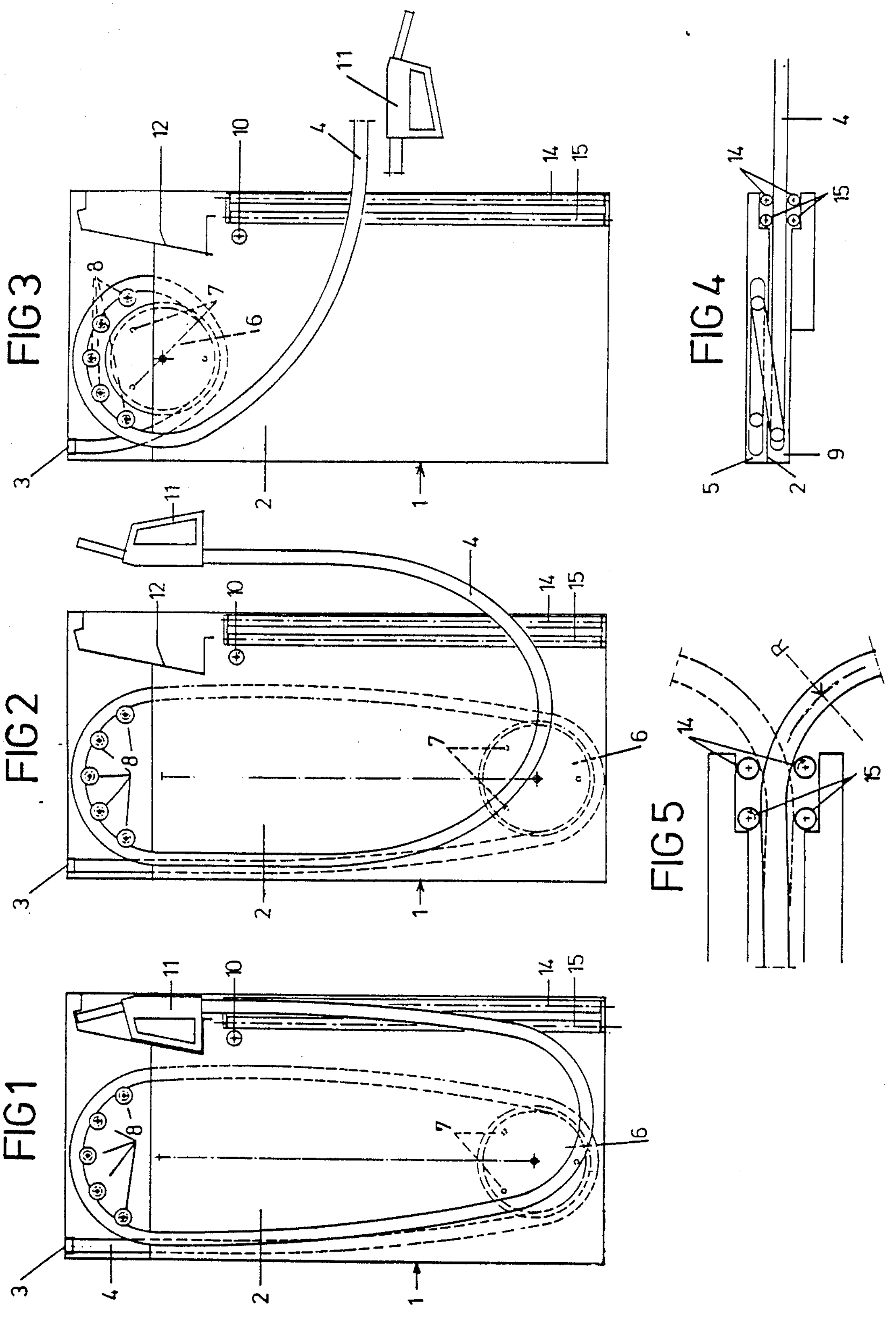
FIG. 1 is a diagrammatic side elevation of a hose storing apparatus with the nozzle in the storage compartment.
FIG. 2 is an elevational view similar to FIG. 1 after removal of the nozzle from the storage compartment.
FIG. 3 is an elevational view similar to FIGS. 1 and 2 with the hose with nozzle in entirely pulled-out position.
FIG. 4 is a diagrammatic top plan view of the apparatus shown in FIG. 3.
FIG. 5 shows a detail of the apparatus shown in FIG. 4 with the hose in two different, uttermost positions.

As shown in the drawings, a hose storing apparatus, in a manner similar to that in the hose storing apparatus described in Dutch patent application 84.03718, includes a casing 1 having a partition 2 not extending to the top of the casing. In the top of the casing, there is provided a fuel supply connection 3 connected to a hose 4. Hose 4 extends in looped form through the compartment 5 (see FIG. 4) of casing 1. The loop contains a freely movable disc 6 serving as a counter weight. The two parallel sides of movable disc 6 are fitted with small projections 7, e.g. made of Teflon. The total width of the disc 6 with the projections 7 is such that this the disc 6 can slide with a slight amount of clearance through compartment 5.

The hose 4, after passing disc 6, extends upwards and projects over a plurality of rollers 8 disposed in the top of the casing, above the partition. The rollers are placed at different angles between 0°–90° in such a manner that the hose can pass easily from compartment 5 to the adjoining compartment 9 (see FIG. 4).

The rollers 8 are arranged in a circular arc having a diameter larger than that of disc 6. As a result, disc 6 can be pulled up closely to rollers 8 (see FIG. 3), so that a maximum length of hose can be pulled outwards.

Compartment 9 of casing 1 of the hose storing apparatus according to the present invention is provided with a storage space bounded by a partitioned cavity 12 for a nozzle 11 mounted on the free end of the hose. To ensure proper guidance of the hose, there is provided a horizontal roller 10 in the said storage space.

A further improvement to facilitate pulling out the hose is obtained by the provision of vertical guide rollers 14, 15. The guide rollers are arranged in pairs and define a vertical passageway for the hose in such a manner that the hose can be pulled out laterally forming a bight having a radius R corresponding to the natural bending radius of a freely depending hose. In this manner, the hose can be pulled outwards to a maximum extent without undue effort.

It is observed that a great many modifications are possible without departing from the scope of the present invention.

I claim:

1. In a hose storing apparatus having a casing, a hose passage outlet in said casing, a fluid supply connection in said casing, a flexible hose attached at one end thereof to said supply connection, a nozzle attached to another end of said hose, a partition vertically disposed within said casing and forming first and second side-by-side compartments within said casing, a counterweighting freely movable disc vertically disposed within said first compartment, and means disposed within said casing and above said partition for passing said hose disposed within said first compartment to said second compartment, the improvement comprising a plurality of horizontally disposed small rollers forming a vertical arc of the small rollers within said casing, said arc of small rollers being disposed above and across said partition, and said hose being disposed from said supply connection into said first compartment in the form of a first loop which passes underneath and partially around said movable disc, over said small rollers, into said second compartment in the form of a second loop and out of said hose passage outlet.

2. A hose storing apparatus as claimed in claim 1 wherein two pairs of elongated, parallel rollers are vertically disposed at said hose passage outlet for passing the said hose between the rollers of each pair of rollers and the pairs of rollers are disposed in a single plain to form front and rear pairs of rollers.

3. The hose storing apparatus of claim 2 wherein the hose is free to move vertically within the pairs of rollers.

4. A hose storing apparatus as claimed in claim 2, where the front and the rear pairs of rollers are so disposed relatively to each other so as to permit the hose to be moved sideways through the pairs of rollers to the extent of the natural bight of the hose.

5. The hose storing apparatus of claim 1 wherein the said arc of small rollers has a diameter which is larger than the diameter of said disc whereby said disc can be pulled by said hose close to the said arc of small rollers.

6. The hose storing apparatus of claim 5 wherein the said arc substantially corresponds to the natural bight of the hose.

7. The hose storing apparatus of claim 5 wherein the small rollers are disposed at different angles to an axis of the casing so that said hose can easily pass from the first compartment to the second compartment.

8. The hose storing apparatus of claim 1 wherein said disc has projections on sides thereof so that there is a small clearance between the projections and walls constituted by the partition and casing forming the first compartment.

* * * * *